Dec. 6, 1949          P. WELCH          2,490,110

VACUUM TUBE

Filed Dec. 13, 1946

INVENTOR
PETER WELCH
BY Thomas H. Heyden
ATTORNEY

Patented Dec. 6, 1949

2,490,110

UNITED STATES PATENT OFFICE 2,490,110

VACUUM TUBE

Peter Welch, London, England, assignor to International Standard Electric Corporation, New York, N. Y., a corporation of Delaware Application December 13, 1946, Serial No. 715,995
In Great Britain October 31, 1945

Section 1, Public Law 690, August 8, 1946
Patent expires October 31, 1965

1 Claim. (Cl. 250—27.5)

This invention relates to electron discharge devices and has for its primary object improvements in the construction of electron discharge devices of the type in which the leads from the electrodes are brought out through a formed glass base in such manner as also to be the external connections for the electrodes.

In electron discharge devices of the type where the contact pins pass through a formed glass base considerable difficulty has been experienced in the past when sealing the base to an envelope due to the fact that it is usually impracticable to anneal the seal properly, so that strains on the glass tend to allow cracks to develop. A method of overcoming this particular difficulty is described in British Patent No. 474,706 in which a glass-metal seal is produced by heating a metallic member which is in contact with the glass member by high frequency induction, so that the thermal energy dissipated by the metallic element through conduction fuses the glass in the immediate vicinity of the metallic member to form an hermatic junction between the glass and the metallic member. In one application of this method a disc of suitable metal is placed in abutting relating with the ends of two opposed portions of hollow glassware which may, for example, be the portions of an enclosing vessel for an electron discharge device.

Another difficulty in connection with the glass base type of tube arises from the need in many cases of providing a metallic screen around the structure and in particular with holding in place a base plate, which usually forms not only a continuation of the screen and means for grounding same, but also a spigot serving the double purpose of protecting a glass exhaust tubulation fixed to the glass base and a convenient means for locating and/or locking the tube into its socket. To this end there have been numerous inventions relating to methods of sealing the base plate of such a valve to the screening can, in some cases to the metallic envelope of the valve and in others to the glass base itself.

It is the object of the present invention to provide a construction especially suitable to this type of glass base valve which shall overcome both the difficulties of sealing the glass base to the envelope and of securing the base plate in position. Accordingly, it is a feature of the present invention that a vitreous base member of an electron discharge device is sealed on to one side of a metallic disc, a second vitreous member forming part or the whole of the envelope of the device is sealed on to the other side of this metallic disc which is spun or otherwise formed into a skirt surrounding the vitreous base member. This skirt may then be used as a clamp for the base plate by spinning or otherwise forming it over the latter so as to clamp and position said base plate in place with respect to the vitreous base.

The invention can be regarded from another point of view, namely, that a metallic clamp is provided for securing the base plate to the vitreous base which clamp is sealed into the glass envelope of the device. The aforesaid base plate will normally carry a spigot for locating and/or locking the electron discharge device into a suitable holder.

The metallic disc or clamp forming the sealing means for the glass base and glass portion of the envelope and the clamp securing the base plate may, if desired be so shaped internally of the envelope as to form a screen and/or support for use in association with the electrode system of the device.

The invention will be better understood and its manner of execution made clear by the following description and drawing illustrating particular embodiments.

Referring now to the drawing

Figure 1:
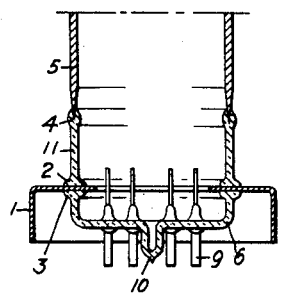
Figure 1 shows in part sectional elevation a metallic disc acting as a seal between the glass base and envelope of an electron discharge device.

After the electrode system (not shown in the drawing) has been assembled onto the glass base 6 which carries contact pins 9 and the electrode system (not shown) and an exhaust tubulation 10, the envelope, which in Fig. 1 is shown as being partly of metal 5 sealed in any convenient manner 4 to a vitreous cylinder 11, is placed over the electrode system and in alignment with the periphery of glass base 6 with the skirted metallic disc 1 intervening. The disc may now be heated by any convenient means, for example by a high frequency induction coil, so that the base 6 and glass member 11 are sealed thereto as at 2 and 3. The heating of the glass members will be localised in the neighbourhood of the seals 2 and 3 so that strains in the body of the glass members are largely obviated.

Figure 2:
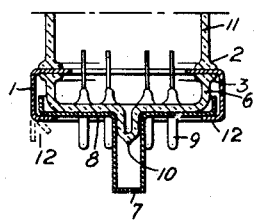
Figure 2 illustrates in part sectional elevation the manner in which the base plate of the device is clamped to the glass base and Figure 3 is a sketch in perspective and part section of the exterior of an electron discharge device embodying the present invention.
Figure 3:
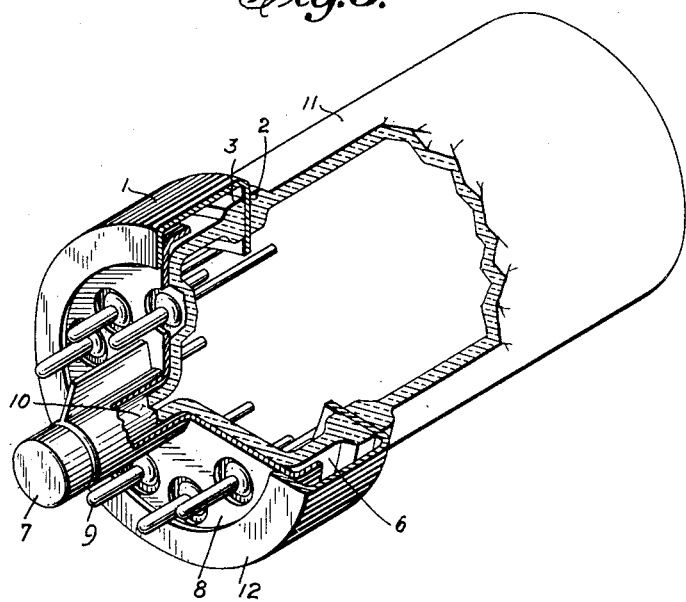

When the electron discharge device has been completely processed, a base plate 8 suitably perforated to accommodate contact pins 9 insulated from plate 8 and carrying a spigot 7 (Figures 2 and 3), is fitted over the glass base 6 and the skirt of the disc 1 is spun or otherwise bent over the edge of the base plate as indicated at 12 in Figure 2, so that finally the whole structure is rigidly held together and hermetically sealed as shown in Figure 3. The spigot 7 is adapted in the well known manner to protect the exchange tubulation 10 and also to provide means for locating and locking the electron discharge device into a suitable holder.

Although the invention has been described with reference to one particular embodiment, it is to be understood that other methods of assembly could be adopted and in particular metal disc 1 may conveniently be utilised as an internal screen and/or electrode support or may even in certain types form one of the actual electrodes of the electron discharge device. Furthermore, if desired, an external screening cover may be placed over the whole envelope contacting with and suitably secured to the metal member 1.

What is claimed is:

An electron discharge device having a vitreous envelope, electrode support and lead in wires connected through a vitreous base member of said envelope, a base plate covering said base member, a metallic clamp securing together the base plate and the vitreous base and sealed into the vitreous envelope, said base plate carrying a spigot for locating the discharge device into a suitable holder.

PETER WELCH.

REFERENCES CITED

The following references are of record in the file of this patent:

UNITED STATES PATENTS

| Number | Name | Date |
|---|---|---|
| 2,238,025 | Miller | Apr. 8, 1941 |
| 2,263,396 | Power | Nov. 18, 1941 |
| 2,278,210 | Morton | Mar. 31, 1942 |
| 2,280,980 | Samuel | Apr. 28, 1942 |
| 2,377,401 | Miller | Dec. 21, 1943 |

FOREIGN PATENTS

| Number | Country | Date |
|---|---|---|
| 421,853 | Great Britain | Jan. 1, 1935 |